United States Patent
Hellmann et al.

(10) Patent No.: US 6,772,059 B2
(45) Date of Patent: Aug. 3, 2004

(54) METHOD FOR ADAPTIVE DISTANCE AND/OR DRIVING SPEED ADJUSTMENT IN A MOTOR VEHICLE

(75) Inventors: Manfred Hellmann, Hardthof (DE); Hermann Winner, Karlsruhe (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/018,726
(22) PCT Filed: Jun. 24, 2001
(86) PCT No.: PCT/DE01/01151
§ 371 (c)(1), (2), (4) Date: Apr. 5, 2002
(87) PCT Pub. No.: WO01/79015
PCT Pub. Date: Oct. 25, 2001

(65) Prior Publication Data
US 2002/0143457 A1 Oct. 3, 2002

(30) Foreign Application Priority Data
Apr. 17, 2000 (DE) .......................... 100 19 189
(51) Int. Cl.$^7$ ................................ B60T 7/12
(52) U.S. Cl. ........................ 701/96; 180/179
(58) Field of Search ............. 701/96, 70, 45, 701/20; 180/170–179, 197, 167, 168, 169; 340/903, 988, 991; 342/457, 170, 71, 72, 73, 107, 146

(56) References Cited

U.S. PATENT DOCUMENTS

| 3,725,921 A | 4/1973 | Elliott et al. |
| 5,665,026 A | 9/1997 | Linden |
| 5,731,977 A | 3/1998 | Oshiage et al. |
| 5,752,214 A | 5/1998 | Kurata et al. |
| 6,496,770 B2 * | 12/2002 | Winner et al. ............... 701/96 |

FOREIGN PATENT DOCUMENTS

| EP | 0 992 388 | 4/2000 |
| JP | 03 246 124 | 11/1991 |
| JP | 06 320 983 | 11/1994 |
| WO | WO 99 20508 | 4/1999 |

OTHER PUBLICATIONS

Winner et al., *Adaptive Cruise Control System—Aspects and Development Trends*, SAE paper 961010 (SAE Technical Paper Series 961010), International Congress and Exposition, Detroit, Feb. 26–29, 1996.

* cited by examiner

Primary Examiner—Richard M. Camby
(74) Attorney, Agent, or Firm—Kenyon & Kenyon

(57) ABSTRACT

A method for the adaptive control of distance and/or driving speed of a motor vehicle. A control device is able to control an engine of the motor vehicle in at least a first operating mode and a brake of the motor vehicle in a second operating mode, a transition being made from the first operating mode to the second operating mode and vice versa as a function of determined quantities.

9 Claims, 3 Drawing Sheets

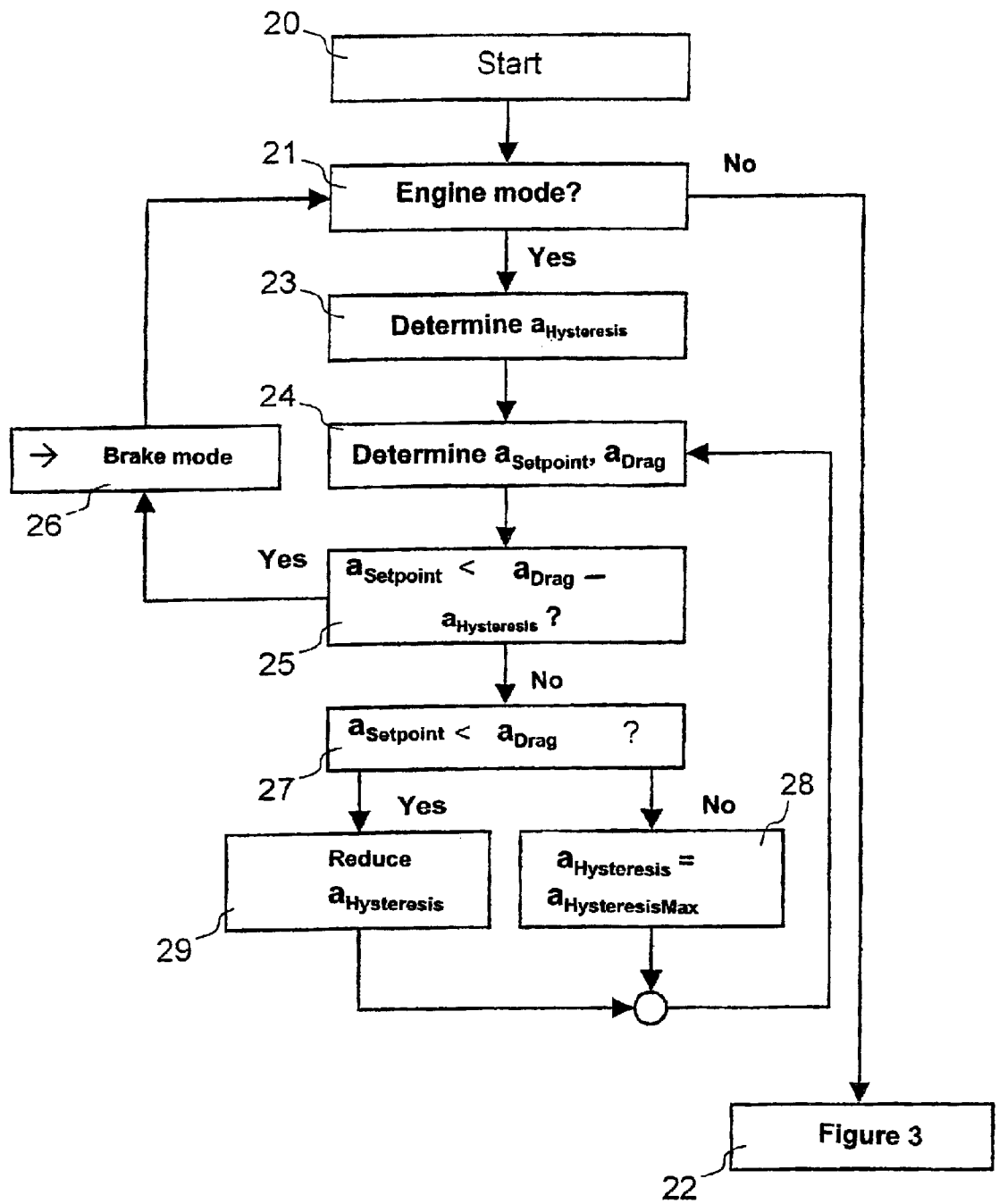

METHOD FOR ADAPTIVE DISTANCE AND/OR DRIVING SPEED ADJUSTMENT IN A MOTOR VEHICLE

FIELD OF THE INVENTION

The present invention relates to a method for adaptive control of distance and/or driving speed of a motor vehicle. Control systems of the species are, for example, also known as adaptive cruise control systems (ACC systems).

BACKGROUND INVENTION

An ACC system based on radar is known from SAE paper 961010 (SAE Technical Paper Series 961010, International Congress and Exposition, Detroit, Feb. 26–29, 1996, "Adaptive Cruise Control System—Aspects and Development Trends", Winner, Witte, Uhler, Lichtenberg, Robert Bosch GmbH). In this case, the radar sensor having multiple target capability is mounted at the front end of a motor vehicle, in order to determine distances from and speeds relative to vehicles driving ahead. The data ascertained by the radar system is supplied to a control unit via a bus system. Using the transmitted radar data and the wishes of the driver, this control unit determines an appropriate acceleration request which, in turn, is transmitted to a longitudinal control unit. The longitudinal control unit controls actuators in accordance with the acceleration request of the control unit. These actuators can be the engine of the motor vehicle, the clutch, or the brakes of the motor vehicle. The corresponding control of the actuators produces a certain behavior of the motor vehicle, which, in turn, is fed back to the control unit, thus forming a control loop. Either the drive train or the brakes are activated as a function of the corresponding acceleration request. The estimated slope of the road is considered in this selection. In addition, the limitations, i.e. physical limitations of the drive train and the braking system, must be known or appropriately calculated.

SUMMARY OF THE INVENTION

A method for the adaptive control of distance and/or driving speed of a motor vehicle, where a control device can control an engine of the motor vehicle at least in a first operating mode and a brake of the motor vehicle in a second operating mode, is first of all (first method) further refined in that a quantity ($a_{Setpoint}$) representing a setpoint deceleration or a setpoint acceleration is determined, and in that, when operating in the first operating mode, a transition is made to the second operating mode when quantity ($a_{Setpoint}$) is within a predefinable range of values.

Secondly (second method), the method is further refined in that a transition is made to the first operating mode when the brake essentially has no decelerating effect.

The result of these two methods of the present invention is that the transition from the first operating mode in which the engine, i.e. the drive of the motor vehicle is controlled to the second operating mode in which the brake of the motor vehicle is controlled, and vice versa is carried out comfortably without any noticeable jerking for the driver of the motor vehicle. The method according to the present invention further achieves that unnecessary brake control and corresponding flickering of the brake lights are prevented.

The first described method is advantageously further refined in that the specifiable range of values is determined as a function of a quantity ($a_{Drag}$) representing a drag torque of the engine, and in that the specifiable range of values includes all values below a threshold value ($a_{Threshold}$). In this context, it is particularly advantageous when threshold value ($a_{Threshold}$) is formed by subtracting a quantity ($a_{Hysteresis}$) representing a hysteresis from a quantity ($a_{Drag}$) representing the drag torque. As a result of these further refinements of the first method of the present invention, a threshold value ($a_{Threshold}$) is formed for the transition from the engine to the brake mode, which takes a certain hysteresis value into consideration in addition to the drag torque of the engine. As a result, it is achieved in a particularly advantageous manner that there is no "flickering switching" between the control of the engine and the control of the brake.

A preferred further refinement of the first method according to the present invention provides that, starting from a determinable instant ($T_{Brake}$), quantity ($a_{Hysteresis}$) representing the hysteresis decreases linearly over time (t) from a maximum value ($a_{HysteresisMax}$) to a minimum value ($a_{HysteresisMin}$). In this context, determinable instant ($T_{Brake}$) is advantageously selected in such a manner that this is the instant at which quantity ($a_{Setpoint}$) representing a setpoint deceleration or a setpoint acceleration is less than quantity ($a_{Drag}$) representing a drag torque. This further refinement achieves that, starting from the instant from which the ACC control device supplies an acceleration request ($a_{Setpoint}$) to longitudinal controller (LOC) that is less than drag torque ($a_{Drag}$) of the engine, hysteresis value ($a_{Hysteresis}$) is continuously decreased. As a result, it is further achieved that in the case in which acceleration request ($a_{Setpoint}$) has a constant value that is less than quantity ($a_{Drag}$) representing the drag torque of the engine or than the drag torque of the engine, a conversion to the brake mode, i.e., the second operating mode, is carried out at the latest when quantity ($a_{Hysteresis}$) representing the hysteresis has decreased to minimum value ($a_{HysteresisMin}$). A particularly advantageous design of the slope with which quantity ($a_{Hysteresis}$) representing the hysteresis linearly decreases over time provides that the slope is proportional to the difference of quantity ($a_{Setpoint}$) representing the setpoint deceleration or the setpoint acceleration and quantity ($a_{Drag}$) representing the drag torque. This design of the slope results in a particularly advantageous manner in a highly dynamic response characteristic. In particular, when the driver of the motor vehicle desires a particularly sharp deceleration, i.e., strongly operates the brake pedal, for instance, the design of the slope according to the present invention leads to a quick transition to the braking branch. As a result of high setpoint deceleration request ($a_{Setpoint}$) being present, quantity ($a_{Hysteresis}$) representing the hysteresis is quickly reduced in the direction of minimum value ($a_{HysteresisMin}$) Depending on the form of minimum hysteresis value ($a_{HysteresisMin}$), a direct transition from the drive branch to the braking branch can occur in an extreme case.

Another advantageous further refinement of the first method provides that quantity ($a_{Drag}$) representing a drag torque is determined as a function of the slope of the road on which the motor vehicle is traveling. For this purpose, a slope estimation, which, is performed particularly after a braking action, can advantageously be carried out in a rapid method. Such a rapid method can be carried out, for example, for a slope estimation using at least one quantity representing an engine output torque and one quantity representing an actual acceleration of the motor vehicle. As a result of this advantageous embodiment, it is possible to estimate the slope at every instant at which there is no braking action. In particular, this embodiment is significant when the vehicle is traveling on roads having significant uphill and downhill grades, e.g. in the mountains, because the influence of the gradient of the road on quantity ($a_{Drag}$) representing a drag torque is particularly great in this instance.

The preferred further refinement of the second method provides that the brake makes available an appropriate signal (NoBrake) on a bus system (CAN bus) when no more decelerating effect is present. In the case of an active brake, this can, for example, be a self-diagnosis unit integrated in the braking system that then provides the appropriate signal on the CAN bus when essentially no more decelerating action is present. The control device present in the motor vehicle according to the second method can, in this case, access the CAN bus and extract the appropriate signal in order to carry out the appropriate method. The method can be further refined in that in the case in which the appropriate signal (NoBrake) from the brake is not present within a predetermine time ($T_{NoBrake}$), a direct transition is made to the first operating mode. In practice, this means that when the brake is no longer being actively controlled, a certain amount of time is allowed to elapse to determine whether the pressure of the active brake or the decelerating action can be reduced. If this is not the case after a certain amount of time, possible wear of the brake is accepted, and the drive train or the engine is accordingly controlled despite the still present decelerating action.

As a result of the embodiment of the second method of present invention, the transition from the second operating mode, i.e., the braking condition, to the operating mode, i.e., the drive mode, is decidedly improved. This embodiment is particularly important since in the case of active brakes, the built up braking pressure is first decreased again. This means that an active brake still has a decelerating effect for a short transition region when the brake is no longer being controlled. To minimize the wear of the active brake in these special operating states, it is particularly advantageous according to the second method of the invention that a transition is first made to the drive mode (first operating mode) when the brake (active brake) essentially exhibits no more decelerating action. This ensures a jerk-free, quick transition between the brake mode and the drive mode.

BRIEF DESCRIPTION OF THE DRAWINGS

FIG. 2 shows a flowchart for implementing the first method of the present invention.

DETAILED DESCRIPTION

Figure 1:
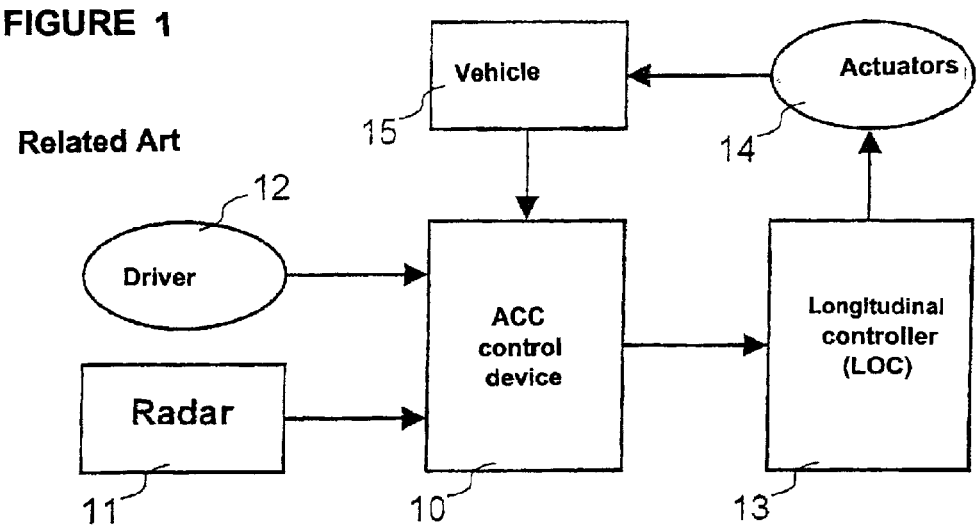
FIG. 1 shows a closed loop of a system for adaptively controlling distance and/or vehicle speed, as is known from the related art, in particular, from the SAE paper 961010.

FIG. 1 shows an adaptive distance and/or vehicle-speed control system for a motor vehicle, as is known from the related art. In this connection, a central control unit 10 (ACC controller, ACC control device) represents the central point of the control system. Speed and distance data for vehicles driving ahead is transmitted by a radar sensor 11 to control unit 10. However; the radar system 11 illustrated here, based on high frequency microwave radiation, can also be designed as a LIDAR or infrared sensor. With regard to radar technology, the method according to the present invention is not limited to an FMCW radar described in the SAE paper 961010, but can also be used, for instance, in connection with a system working in accordance with the impulse radar principle. The speed data of vehicles driving ahead (and also of other detected objects, e.g. stationary objects at the side of the road), which are transmitted by radar unit 11 to control unit 10, are relative speed values based on the speed of one's own vehicle. In addition, signals are transmitted to control unit 10 by driver 12 of the motor vehicle. These signals can be, for example, gas pedal positions, brake interventions, steering movements, but also operating functions for the ACC system. From the data supplied by driver 12 and radar unit 11, control unit 10 determines an acceleration request that is transmitted to a longitudinal control unit 13 (LOC). Longitudinal control unit 13 serves the purpose of converting the acceleration requirements transmitted by control unit 10 into corresponding control signals for actuators 14. Actuators 14 can generally be accelerating or decelerating means. A throttle valve control could conceivably be an accelerating means, while an intervention in the (active) brake system could be regarded as a decelerating means. Depending on the control of actuators 14, a corresponding driving behavior of vehicle 15 results. This instantaneous vehicle condition data is transmitted from vehicle 15 to control unit 10. This feedback of the current vehicle data completes the closed loop that includes control unit 10, longitudinal control unit 13, actuators 14, and vehicle 15.

FIG. 2 shows an exemplary embodiment of the first method of the invention that is used for the transition from the drive mode to the brake mode. In this context, after start 20 of the method, it is first checked in step 21 whether the vehicle is currently in the first operating mode, i.e., the engine mode. If this is not the case, a transition is made in step 22 to the exemplary embodiment of the second method of the invention according to FIG. 3 that is used for the transition from the brake mode to the drive mode. If it is determined in step 21 that the vehicle is in the first operating mode/engine mode, step 23 follows in which the current value for quantity ($a_{Hysteresis}$) representing a hysteresis is determined. The description of FIG. 5 discusses the determination of quantity ($a_{Hysteresis}$) in greater detail. The setpoint acceleration and acceleration ($a_{Drag}$) produced by the engine torque, are then determined in step 24. This can be carried out, for example, in an ACC control device 10 according to FIG. 1. Generally, the acceleration ($a_{Drag}$) produced by the drag torque can assume positive values (e.g. on sharp downhill grades) or negative values (predominant case). A check is then made in step 25 to determine whether setpoint acceleration ($a_{set\ point}$) requested by ACC control device 10 is less than the difference of acceleration ($a_{Drag}$) based on the drag torque and acceleration ($a_{Hysteresis}$) based on the hysteresis value, ($a_{Drag}-a_{Hysteresis}$). If this is the case, a transition is made to the second operating mode/brake mode in step 26. In accordance with the exemplary embodiment, above described step 21, in which a query is made to determine whether the vehicle is in the engine mode, follows step 26. Since this is not the case at this point since a switch was previously made to the second operating mode, the method enters step 22, which represents the connection to the exemplary embodiment of the second method of the invention represented in FIG. 3.

If it is determined in step 25 that setpoint acceleration ($a_{Setpoint}$) is not less than the difference of drag torque acceleration ($a_{Drag}$) and hysteresis acceleration ($a_{Hysteresis}$), step 27 follows. In step 27, a check is made to determine whether setpoint acceleration ($a_{Setpoint}$) is at least less than acceleration ($a_{Drag}$) based on the drag torque. If this is the case, step 28 follows. Practically speaking, this means that the deceleration requested by ACC control device 10 can only be achieved in the present driving condition by the drag torque of the engine, and an active intervention in the brake system or a transition to the second operating mode is not necessary. In accordance with this situation, the value for acceleration hysteresis ($a_{Hysteresis}$) is set in step 28 to maximum acceleration hysteresis value ($a_{HysteresisMax}$) and a transition is made to above described step 24 of the method. In this instance, in accordance with the changing operating situation, an updated value of setpoint acceleration ($a_{Setpoint}$) and of the acceleration ($a_{Drag}$) based on the drag torque is determined, and the method continues as previously described.

However, if it is determined in step 27 that setpoint acceleration ($a_{Setpoint}$) is less than acceleration ($a_{Drag}$) produced by the drag torque, the method skips to step 29, in which the value for acceleration hysteresis ($a_{Hysteresis}$) is decreased. The manner in which hysteresis ($a_{Hysteresis}$) is decreased and in which maximum acceleration hysteresis value ($a_{HysteresisMax}$) and a minimum acceleration hysteresis value ($a_{HysteresisMin}$), to which acceleration hysteresis value ($a_{Hysteresis}$) is maximally reduced, is determined is described in more detail within the framework of the description of FIG. 5. As occurred after step 28, step 24 follows step 29, in which acceleration hysteresis value ($a_{Hysteresis}$) is reduced, and the method continues in accordance with the preceding description.

Figure 3:
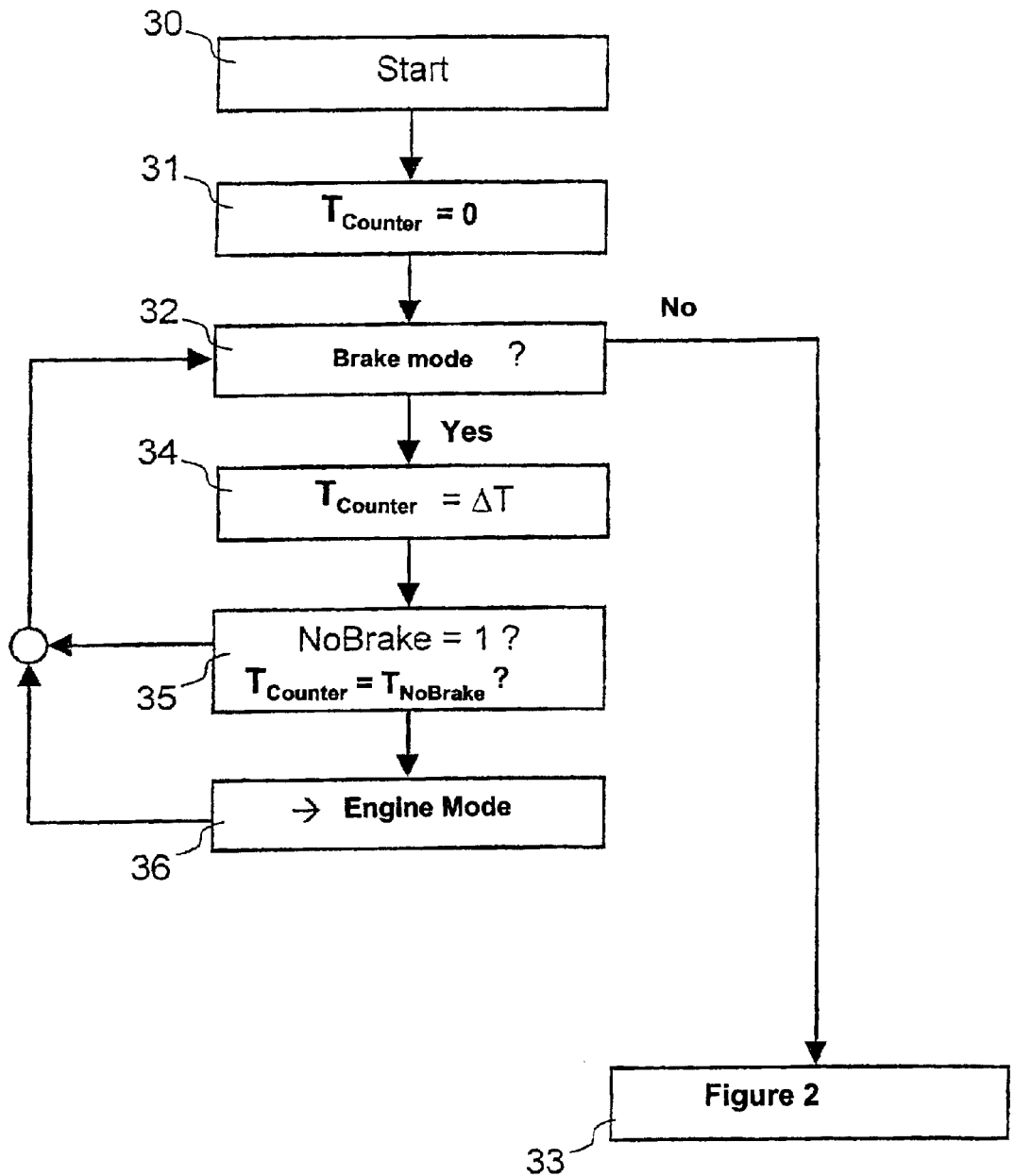
FIG. 3 shows a flowchart for implementing the second method of the present invention.

FIG. 3 shows an exemplary embodiment of the first method of the invention that is used for the transition from the second operating mode/brake mode to the first operating mode/drive mode. After the start of the second method of the invention in step 30, a time counter ($T_{Counter}$), which is needed for further process steps, is first set to zero in a step 31. In subsequent step 32, a check is made to determine whether the motor vehicle is in the second operating mode/brake mode. If this is not the case, step 33 follows which corresponds to the start of previously described FIG. 2, i.e., the transition to the first method of the invention that represents the transition from the first to the second operating mode.

However, if it is determined is step 32 that the motor vehicle is in the second operating mode/brake mode, step 34 follows. In step 34, time counter ($T_{Counter}$), which was set to zero is step 31, is set to time value $\Delta T$, which corresponds to the time period since setpoint acceleration ($a_{Setpoint}$) was first determined to be greater than acceleration ($a_{Drag}$) produced by the drag torque, or, in general, since a request for the first operating mode/drive mode exists. For example, an appropriate bit/flag, which is evaluated in step 34, can be set to determine during which run-through of the second method of the invention this is the case. Step 34 is followed by step 35, in which a check is made, on the one hand, to determine whether the active brake still has a decelerating effect (NoBrake=0 corresponds in this instance to a still present deceleration, for example). This can be carried out, for example, in that the active brake automatically, e.g., as the result of a self-diagnosis, applies an appropriate signal (NoBrake) to a bus system of the motor vehicle, e.g. a CAN bus. If this flag or signal (NoBrake=1) is set or is present, a check is also performed to determine, on the other hand, whether time period $T_{Counter}$ corresponds to applicable time period $T_{Brake}$, or the method immediately proceeds with step 36.

In the event that appropriate signal (NoBrake) is not present and (NoBrake=0), i.e the active brake still exhibits deceleration, a check is performed to determine whether time period $T_{Counter}$ corresponds to applicable time period $T_{NoBrake}$. Applicable time period $T_{NoBrake}$ can be dimensioned, for example, in such a manner that in every case a transition is made to the drive mode after 0.5 s. In other words, a check is performed to determine whether time span $T_{NoBrake}$ has passed without it having been determined in step 35 that the active brake essentially no longer has a decelerating effect. Thus, a check is made to determine whether after an applicable time span ($T_{NoBrake}$), the active brake is pressure-free, or whether the active brake still has a slight decelerating effect. If it is determined in step 35 that the instant has not yet been reached, the method jumps back to step 32 and continues accordingly.

In the event that it is determined in step 35 that appropriate signal (NoBrake) is not present and time period $T_{Counter}$ also does not yet correspond to applicable time period $T_{NoBrake}$, step 35 is followed by step 32.

In step 36, the transition to the first operating mode is carried out. In other words, when setpoint acceleration ($a_{Setpoint}$) is greater than acceleration ($a_{Drag}$) produced by the drag torque of the engine and the brake of the motor vehicle essentially has no more decelerating effect (NoBrake=1), a transition is made after step 36 to the engine mode/first operating mode.

In practical terms, a request for the first operating mode/drive mode is always present when requested acceleration setpoint value ($a_{Setpoint}$) exceeds the value of acceleration ($a_{Drag}$) based on the drag torque.

Figure 4:
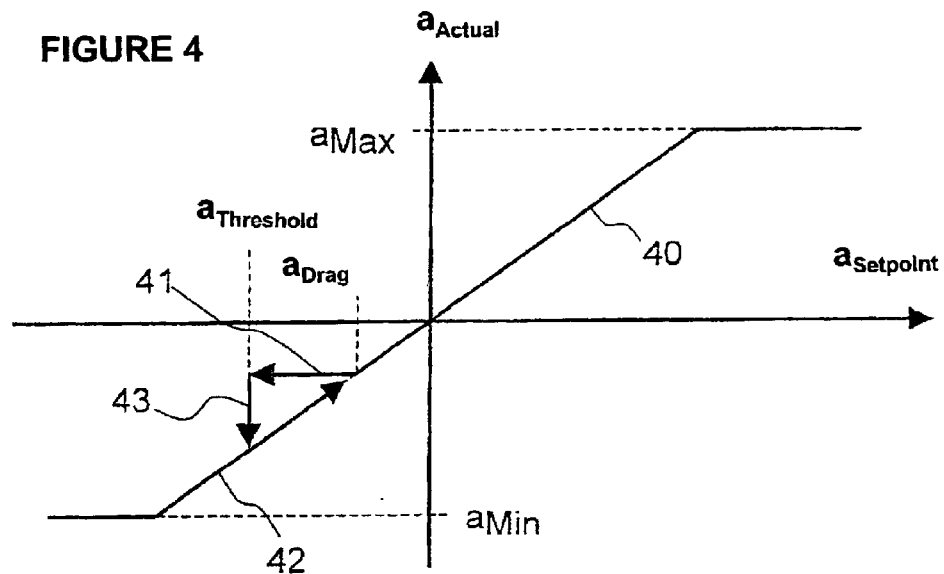
FIG. 4 shows the transition from the first to the second operating mode and vice versa.

FIG. 4 shows the effects of the method of the invention on the correlation between setpoint acceleration value ($a_{Setpoint}$) requested by ACC control device 10 and actual acceleration value ($a_{Actual}$), with which the vehicle is actually accelerated. Setpoint acceleration ($a_{Setpoint}$) is represented on the horizontal axis, while actual acceleration ($a_{Actual}$) is represented on the vertical axis. Actual acceleration ($a_{Actual}$) is limited in the positive direction by a maximum value ($a_{Max}$) and in the negative direction by a minimum value ($a_{Min}$) to values representing the physical limits of the engine of the motor vehicle. It is assumed that acceleration request ($a_{Setpoint}$) decreases on the basis of a certain gas pedal position. In this context, for example on the characteristic line designated by reference numeral 40 in the representation in FIG. 4. one would be moving in the direction of lower setpoint acceleration values ($a_{Setpoint}$). In the case of further decreasing setpoint acceleration request ($a_{Setpoint}$), the acceleration request according to characteristic line 40 would change to the negative range at a certain instant. In the case of a further decreasing setpoint acceleration request, the acceleration value corresponding to acceleration ($a_{Drag}$) produced by the drag torque of the motor vehicle is reached at a certain instant. From this instant on, the course of the setpoint acceleration for further decreasing or negative setpoint acceleration values ($a_{Setpoint}$) moves on characteristic line 41 in the direction of threshold value ($a_{Threshold}$). If setpoint acceleration request ($a_{Setpoint}$) reaches values less (more negative) than threshold value ($a_{Threshold}$), a transition is made from the drive mode to the brake mode. This transition is indicated by the jump of characteristic line 43. This representation makes it clear that a transition is not made to the control of the brake as an immediate result of the drag torque not being met, but that a certain hysteresis range resulting from the difference of threshold value ($a_{Threshold}$) and acceleration ($a_{Drag}$) on the basis of the drag torque must first be exceeded. If this hysteresis range is exceeded, a transition is immediately made to the control of the brake.

The opposite case exists when the motor vehicle is in a state of active braking, and the vehicle is decelerated. In this instance, one is located at any point on the characteristic line designated by reference numeral 42 in the representation in FIG. 4. If setpoint acceleration request ($a_{Setpoint}$) increases, characteristic line 42 is run through in the direction of increasing setpoint acceleration values ($a_{Setpoint}$) and increasing actual acceleration values ($a_{Actual}$). The query condition that there is essentially no more decelerating effect of the active brake is not shown in the representation in FIG. 4. If this is the case that there is essentially no more decelerating action of the active brake, a transition is made to the first operating mode in the case of further increasing setpoint acceleration values ($a_{Setpoint}$). If a transition is made from the second operating mode to the first operating mode, the operating point in the representation according to FIG. 4 jumps from characteristic line 42 to characteristic line 40.

In practice, the transition to the first operating mode is carried out upon reaching setpoint acceleration values ($a_{Setpoint}$) greater than the acceleration ($a_{Drag}$) on the basis of the drag torque and when there is essentially no more decelerating effect of the active brake.

Figure 5:
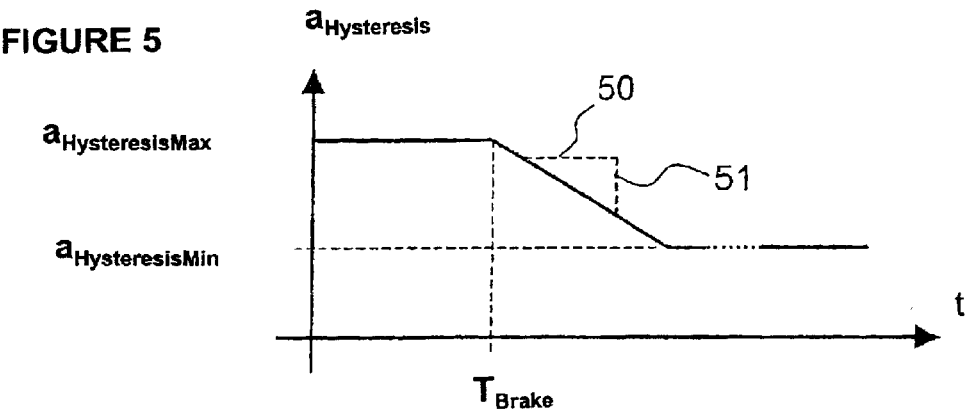
FIG. 5 shows the dependence of quantity ($a_{Hysteresis}$) representing the hysteresis on time.

FIG. 5 shows a possible course of a quantity ($a_{Hysteresis}$) representing a hysteresis, in accordance with the first method of the invention. In this instance, quantity ($a_{Hysteresis}$) representing the hysteresis is represented on the vertical axis as a function of time (t) on the horizontal axis. In this exemplary embodiment, hysteresis value ($a_{Hysteresis}$) according to FIG. 5 is determined from the difference of threshold value ($a_{Threshold}$) and drag value ($a_{Drag}$) according to characteristic line 41 in FIG. 4. The value range of quantity ($a_{Hysteresis}$) representing the hysteresis is limited by maximum value ($a_{HysteresisMax}$) and minimum value ($a_{HysteresisMin}$). At the start of the method of the invention, the value for hysteresis ($a_{Hysteresis}$) assumes maximum value ($a_{HysteresisMax}$). Starting from the instant from which setpoint acceleration ($a_{Setpoint}$) is less than quantity ($a_{Drag}$) representing a drag torque, this instant being designated as $T_{Brake}$, the value for quantity ($a_{Hysteresis}$) representing a hysteresis decreases linearly from maximum value ($a_{HysteresisMax}$) to minimum value ($a_{HysteresisMin}$). The slope of the decline, which can be expressed by the quotient of drawn in segments 51 to 50, is proportional to the difference of setpoint acceleration ($a_{Setpoint}$) and acceleration ($a_{Drag}$) on the basis of the drag torque:

$$\frac{\text{Segment 51}}{\text{Segment 50}} = \text{Constant}(a_{Setpoint} - a_{Drag})$$

As a result of this design of the slope according to the present invention, with which quantity ($a_{Hysteresis}$) representing the hysteresis is linearly reduced, the dynamic changes of the acceleration request can be considered in detail in a particularly advantageous manner since high setpoint acceleration requests ($a_{Setpoint}$) lead directly to a significant decline in quantity ($a_{Hysteresis}$) representing the hysteresis. The advantage of this temporal decline in quantity ($a_{Hysteresis}$) representing the hysteresis also becomes clear when viewed in combination with the representation according to FIG. 4: It is assumed that a setpoint acceleration request ($a_{Setpoint}$) exists that is in the middle of segment 41 according to FIG. 4, i.e., between the values for ($a_{Threshold}$) and ($a_{Drag}$). According to the representation in FIG. 4, a transition would also then not be made from the engine to the brake mode, i.e., from the first to the second operating mode, when this determined setpoint acceleration request value ($a_{Setpoint}$) is present for an extended period of time as a request signal. However, according to the representation in FIG. 5, segment 41 or the value for quantity ($a_{Hysteresis}$) representing the hysteresis, which corresponds to the difference of threshold value ($a_{Threshold}$) and drag value ($a_{Drag}$), decreases over time. As a result, the value for $a_{Hysteresis}$ is so small starting from a certain instant that a transition is made in every case from the engine mode to the brake mode. For this purpose, it is particularly advantageous that the value of $a_{HysteresisMin}$ is set to 0, so that, after a certain instant, a transition is made to the brake mode even when an acceleration request in the order of magnitude of acceleration ($a_{Drag}$) produced by the drag torque of the engine, exists as setpoint acceleration request ($a_{Setpoint}$). An acceleration in the order of magnitude of acceleration ($a_{Drag}$) on the basis of the drag torque can be selected as maximum hysteresis value ($a_{HysteresisMax}$).

Furthermore, it is within the framework of the method of the present invention that the signals of the active brake of the different axles (front axle and back axle) are evaluated differently. Thus, it is possible, for example, that given a certain setpoint acceleration request ($a_{Setpoint}$), the driven axis is selected such that the brakes are not controlled in this instance, but only the drag torque of the engine is used as a decelerating action while the active brakes are controlled at the free-running axis.

What is claimed is:

1. A method for performing an adaptive control of at least one of a distance and a driving speed of a motor vehicle, comprising the steps of:

causing a control device to control an engine of the motor vehicle in at least a first operating mode and a brake of the motor vehicle in a second operating mode;

determining a quantity representing one of a setpoint deceleration and a setpoint acceleration;

forming a threshold value by subtracting a quantity representing a hysteresis from a quantity representing a drag torque of the engine;

determining a specifiable range of values as a function of the quantity representing the drag torque of the engine, wherein the specifiable range of values includes all values less than the threshold value; and when operating in the first operating mode, making a transition to the second operating mode when the quantity is within the specifiable range of values.

2. The method according to claim 1, wherein:

starting from a determinable instant, the quantity representing the hysteresis decreases linearly over time from a maximum value to a minimum value.

3. The method according to claim 2, wherein:

the determinable instant is the instant at which the quantity representing one of the setpoint deceleration and the setpoint acceleration is less than the quantity representing the drag torque.

4. The method according to claim 2, wherein:

a slope with which the quantity representing the hysteresis linearly decreases over time is proportional to a difference of the quantity representing one of the setpoint deceleration and the setpoint acceleration and the quantity representing the drag torque.

5. The method according to claim 1, further comprising the step of:

determining the quantity representing the drag torque as a function of a slope of a road on which the motor vehicle is traveling.

6. The method according to claim 5, further comprising the step of:

estimating the slope in a rapid operation after a braking intervention.

7. The method according to claim 6, wherein:

at least one quantity representing an engine output torque and one quantity representing an actual acceleration of the motor vehicle are taken into consideration for estimating the slope.

8. A method for performing an adaptive control of at least one of a distance and a driving speed of a motor vehicle, comprising the steps of:

causing a control device to control an engine of the motor vehicle in at least a first operating mode and a brake of the motor vehicle in a second operating mode; and when operating in the second operating mode, making a transition to the first operating mode when the brake has no more decelerating effect;

wherein the brake makes available a signal on a bus system when no more decelerating effect is present.

9. The method according to claim 8, further comprising the step of:

when the signal from the brake is not present within a predetermined time, making a direct transition to the first operating mode.

* * * * *